United States Patent

[11] 3,619,497

[72] Inventor Richard John Godwin Ellis
Cambridge, England
[21] Appl. No. 853,667
[22] Filed Aug. 28, 1969
[45] Patented Nov. 9, 1971
[73] Assignee Pye Limited
Cambridge, England
[32] Priority Aug. 28, 1968
[33] Great Britain
[31] 41,056/68

[54] FIELD AND PICTURE SYNCHRONIZING PULSE SEPARATORS
8 Claims, 2 Drawing Figs.

[52] U.S. Cl. 178/7.3 S, 328/139, 178/69.5 TV
[51] Int. Cl. H04n 5/04
[50] Field of Search 178/7.35, 7.55, 69.5 TV; 328/139; 307/232, 234

[56] References Cited

UNITED STATES PATENTS

| | | | |
|---|---|---|---|
| 3,487,167 | 12/1969 | Riggin et al. | 178/7.3 S |
| 3,527,887 | 9/1970 | Clapp et al. | 178/7.3 S |
| 2,853,550 | 9/1958 | Reid | 178/7.5 S |

*Primary Examiner*—Robert L. Griffin
*Assistant Examiner*—John C. Martin
*Attorney*—Frank R. Trifari

ABSTRACT: A synchronization signal separator circuit features an AND gate which has a synchronization signal applied to one input. The second input receives an enabling signal that starts during the first and ends during the second pulses of the vertical synchronizing pulse group.

PATENTED NOV 9 1971 3,619,497

SHEET 1 OF 2

INVENTOR.

RICHARD J. G. ELLIS

BY

AGENT

INVENTOR.
RICHARD J. G. ELLIS
BY
AGENT

FIELD AND PICTURE SYNCHRONIZING PULSE SEPARATORS

This invention relates to a synchronizing pulse separator system which will derive from the combined horizontal and vertical synchronizing waveform of a television transmitting system, accurately timed reference pulses at field and picture frequencies.

The horizontal synchronizing signal comprises a series of pulses at line frequency, the leading edge of each pulse occurring at the start of a line period.

The width of each pulse is 4.7$\mu$ sec. in the United Kingdom 625 line television transmission system, the pulse width, and the timings given below also being for this system. The pulse widths and timings for other 625 line systems and also the 525 line FCC system are also similar to those given.

The vertical synchronizing signal which occurs at the commencement of each field period comprises a group of five pulses, each broad in comparison with the line synchronizing pulses, and at a repetition rate equal to twice the line frequency, so that the complete vertical synchronizing signal occupies a time equivalent to 2½ lines. The signal is repeated for each field period, with the leading edge of the first of the five pulses occurring at the commencement of the field period. Typically, the width of the individual pulses 27.3$\mu$ sec.

The vertical synchronizing signal is preceded by a group of five narrow pulses (typically 2.4$\mu$ sec. wide) at a recurrence rate of twice the line frequency, and is followed by a similar group of five narrow pulse. These are referred to as equalizing pulses. The horizontal and vertical signals are added together to give a combined synchronizing signal. In the 625 and 525 line systems, employing interlaced scanning, each complete picture comprises two fields referred to as even and odd fields. The even fields commence at the beginning of the first line and contain half the total number of lines, ending at the midpoint of a line, since the total number of lines is odd. The odd fields commence at the midpoint of the line on which the even fields end, and contain the remaining lines, ending at the end of the last line of the picture.

The nature of the vertical synchronizing and equalizing signals is such that they contain leading edges of pulses at times corresponding to the start of each line which occurs when these signals are present.

Therefore a horizontal synchronizing signal for each line may readily be derived from the combined synchronizing signal.

For many purposes, a vertical synchronizing signal may be separated with sufficient accuracy from the combined signal by comparing the mean level of the signal during the five broad pulses with its mean level during the narrow equalizing pulses which precedes and follows the broad pulses.

Determining the mean level involves loss of the fine structure of the signal, so that there is some measure of uncertainty in the timing of a vertical reference pulse derived in this manner with respect to the field datum point, i.e. the leading edge of the first broad pulse.

An object of the present invention is to produce from the combined synchronizing signal a first vertical reference pulse, recurring at field frequency, having a constant and accurately known timing with respect to the field datum point.

A second object of the invention is to produce a second vertical reference pulse recurring at picture frequency, and having a constant and accurately known timing with respect to the field datum point.

The present invention provides a synchronizing pulse separator system in which a gate circuit is adapted to receive at its first input the combined synchronizing signal for a television waveform, the second input of said gate circuit being adapted to receive a signal derived from the combined synchronizing signal for enabling said gate circuit to pass signals present at its first input for a period which commences during the first and ends during the second of the pulses of the vertical synchronizing pulse group, the arrangement being such that the output of the gate circuit is a pulse having a leading edge defined by the trailing edge of the first and a trailing edge defined by the leading edge of the second of the pulses of the vertical synchronizing pulse group. This pulse will appear for every vertical synchronizing signal contained in the combined waveform, i.e. it will recur at field frequency.

To obtain a pulse recurring at picture frequency (equals half the field frequency) the output of the first mentioned gate circuit is fed to a first input of a further gating circuit. To a second input is fed a signal, derived from the combined synchronizing signal, such that, during each line period, the further gating circuit is blocked for a period somewhat longer than the first half of the line period, but is enabled to pass signals for the remainder of the line period. In this way, those of the vertical reference pulses applied to the first input which correspond to even fields and which occur in the first half of a line period will be blocked, while those corresponding to odd fields and occurring towards the end of a line period will appear in the output of the second gating circuit.

A preferred embodiment of the invention will now be described in more detail, with reference to the drawings accompanying the provisional specification, of which:

Figure 2:
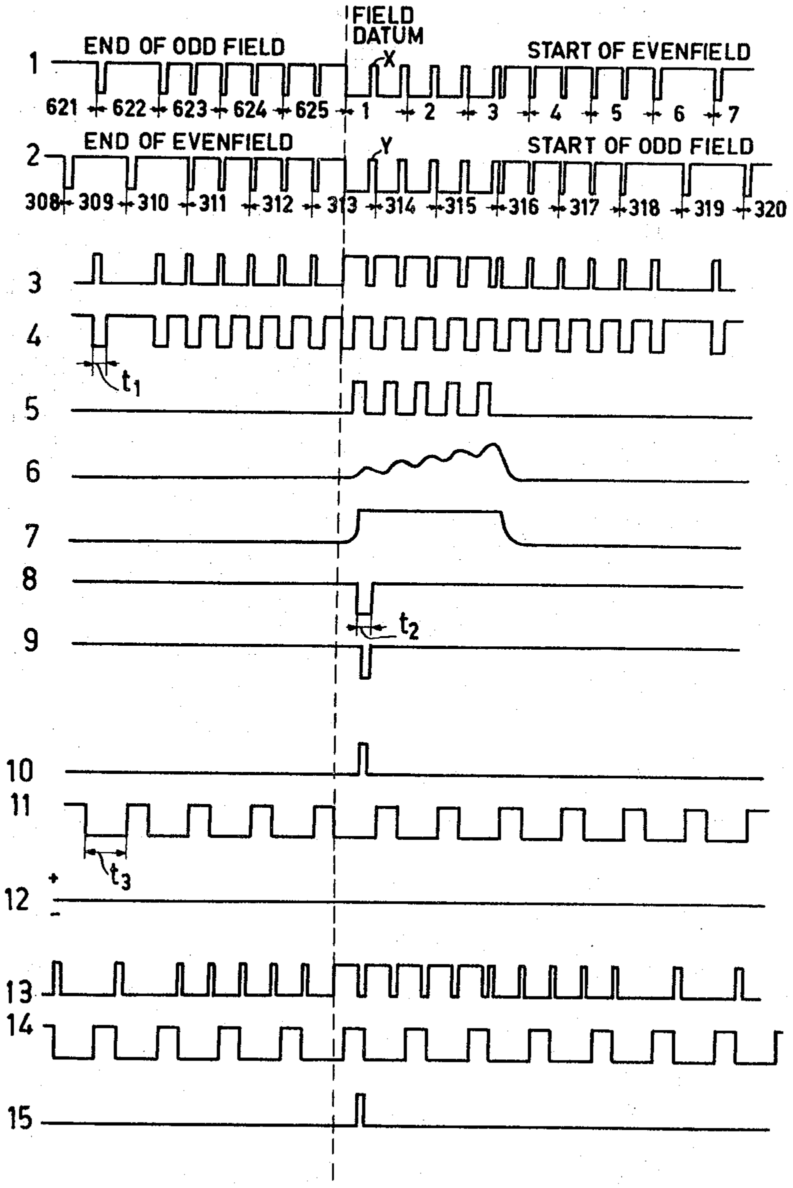
FIG. 2 illustrates the waveform at various points of the circuit.

Referring first to FIG. 2, waveform 1 illustrates the combined synchronizing signal at the end of an odd field and the start of an even field. There are shown the negative going line synchronizing pulses at the start of lines 622 and 623, then the group of five narrow equalizing pulses, at the midpoint of line 623, and the beginnings and midpoints of lines 624 and 625. The leading edge of the first of the group of five broad pulses which constitute the vertical synchronizing signal occurs at the start of line 1, and the first of the five equalizing pulses following the vertical synchronizing signal follows at the midpoint of line 3. After the equalizing pulses there come the line synchronizing pulses for lines 6 and 7.

Line synchronizing pulses continue uninterrupted through the even field up to and including line 310, when the equalizing pulses preceding the vertical synchronizing signal for the odd field commence at the beginning of line 311. The combined synchronizing waveform at the end of the even field and the beginning of the odd field is illustrated in FIG. 2 as waveform 2. It will be seen that the leading edge of the first of the five broad pulses occurs at the midpoint of line 313, the first of the five equalizing pulses following the vertical synchronizing signal occurs at the start of line 316, and the normal line synchronizing pulses recommence at line 319.

The portion which is to be gated out of combined synchronizing waveform to form the vertical reference pulse is indicated at X in waveform 1 and Y in waveform 2.

Figure 1:
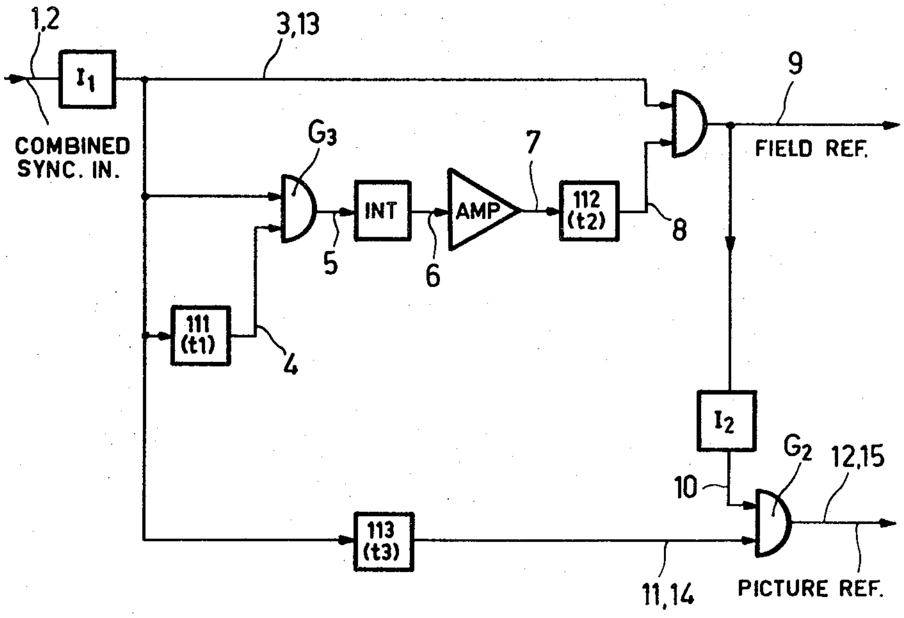
FIG. 1 is a block schematic diagram of a preferred embodiment.

Referring now to FIG. 1, the combined synchronizing signal is fed to the input of an inverter stage $I_1$. The output of this inverter stage $I_1$ is connected to a first input of a gate $G_1$, to a first input of a gate $G_3$, to the input of a monostable multivibrator 111 and to the input of a monostable multivibrator 113. A second input of gate $G_3$ is connected to the output of the multivibrator 111.

The output of gate $G_3$ is connected to the input of an integrator stage INT whose output is connected to the input of an amplifying and limiting stage AMP. A monostable multivibrator 112 is triggered from the output of the stage AMP, the output from the multivibrator 112 being connected to a second input of the gate $G_1$.

The waveform present at the output of inverter $I_1$ is shown in FIG. 2 as waveform 3 for odd to even fields and as waveform 13 for even to odd fields.

The monostable multivibrator 111 is arranged to produce a negative going output pulse when triggered by the leading edge of a positive going input signal. The width $t1$ of each output pulse must be greater than the width of the equalizing pulses (2.4$\mu$ sec.) or the line synchronizing pulses (4.7$\mu$ sec.) but less than the width of the vertical synchronizing pulses.

Preferably $t1$ is approximately $18\mu$ sec. The multivibrator 111 is triggered by each positive going edge of waveform 3 and 13, and so produces a train of negative-going pulses corresponding to these edges. The output waveform of multivibrator 111 corresponding to input waveform 3 is shown in FIG. 2 as waveform 4.

The inverted synchronizing waveform is, as previously stated, applied to the first input of the gate $G_3$ and the output waveform of multivibrator 111 to the second gate input. Gate $G_3$ is arranged to provide a positive output only when both inputs are positive going. From waveforms 3 and 4, it is apparent that this condition is satisfied only during the latter part of each of the broad vertical synchronizing pulses. The output from gate $G_3$ at the start of an even field, i.e. corresponding to input waveforms 3 and 4, is shown in FIG. 2 as waveform 5. A similar waveform is obtained at the start of an odd field.

Waveform 5 is not itself suitable for use as a vertical reference signal, since the timing of the loading edges of the pulses is determined by the monostable multivibrator 111 and not directly by the combined synchronizing signal. Waveform 5 is fed to the integrator circuit Int, which produces an output having generally as that shown in FIG. 2 as waveform 6. This is amplified and limited in the amplifier stage AMP to give an output of the form shown in FIG. 2 as waveform 7.

The gain of the stage AMP is high, so that the leading edge of waveform 7 is sufficiently steep, so that it reaches its limiting value at a time before the end of the first pulse of waveform 5, i.e. before the end of the first broad pulse of waveforms 3 and 13, at a time less than $27.3\mu$ sec. after the field datum point.

The leading edge of waveform 7 is used to trigger a further monostable multivibrator 112. The output of multivibrator 112 is a negative-going pulse of width $t2$, shown in FIG. 2 as waveform 8. The leading edge of the pulse occurs at some point on the leading edge of waveform 7, i.e. at a time more than $t1$ but less than $27.3\mu$ sec. after the field datum point, the exact time being dependent on the gain of the stage AMP.

The width of the pulse $t2$ is chosen so that its trailing edge occurs after the leading edge but before the trailing edge of the second of the vertical synchronizing pulses, i.e. the tailing edge occurs at a time greater than $32\mu$ sec., but less than $59.3\mu$ sec., after the field datum points. Preferably the nominal value of $t$=$t1$ =$18\mu$ sec., allowing a reasonable tolerance on both $t1$ and $t2$.

The gate circuit $G_1$ has the inverted combined synchronizing waveforms 3 and 13 applied to its first input and the output from the multivibrator 112 applied to its second input. Gate $G_1$ is arranged to give a negative going output only when both its inputs are negative going, a positive going output being provided for all other combinations of input signals. It is apparent that the output from gate $G_1$ will be a negative going pulse with edges defined by the trailing edge of the first and the leading edge of the second vertical synchronizing pulse, as shown in FIG. 2 waveform 9. For a 625 line system, the leading edge will be $27.3\mu$ sec and the trailing edges 32.0 $\mu$sec. after the field datum point, and the pulse will recur at the start of each field so providing the field reference signal.

To obtain a pulse recurring at the picture frequency, the output from the gate $G_1$ is fed to an inverter stage $I_2$, the output from this inverter stage which is shown in FIG. 2 as waveform 10 being fed to a first input of a gate $G_2$.

The monostable multivibrator 113 is triggered by positive going edges of the inverted combined synchronizing waveforms 3 and 13. The output pulses from multivibrator 113 have a width t3 which is greater than half a line period, but less than a whole line period. Preferably $t3\mu40\mu$sec. If the multivibrator 113 is triggered by an edge at the start of a line period, it cannot be triggered again by an edge occurring half a line period later, but will be triggered by an edge occurring at the start of the next line period. The output from multivibrator 113 and which is therefore at line frequency is applied to a second input of the gate $G_2$.

This gate $G_2$ is arranged to give a positive going output when both its inputs are positive going and a negative going output for all other input combinations. There are two situations to consider, the beginning of an even field and the beginning of an odd field.

At the beginning of an even field, the multivibrator 113 is triggered by waveform 3, and has an output of the form shown in waveform 11. Waveform 10 is applied to one input and waveform 11 to the other input of the gate $G_2$. When waveform 10 is positive going, waveform 11 is negative going, therefore the output of gate $G_2$ stays negative going (waveform 12).

At the beginning of an odd field, multivibrator 113 is triggered by waveform 13, and gives an output as shown in waveform 14. This waveform is positive going when waveform 10 is positive going. The output of gate $G_2$ therefore contains a positive going pulse corresponding to that in waveform 10, and this pulse recurs at the beginning of each odd field, i.e. at picture frequency, and is the picture reference signal.

The arrangement described above may be modified in a number of ways. If it is desired to obtain a pulse recurring at picture frequency, but near to the commencement of the even fields, the inverter 12 may be omitted, so that waveform 9 is applied directly from the output of gate $G_1$ to the first input of gate $G_2$, gate $G_2$ being modified to give an output when both its inputs are negative going.

In the system described, monostable multivibrators 111, 112 and 113 are triggered by positive-going input signals and give negative-going outputs. It is possible to employ monostable multivibrators which are triggered by negative going signals and giving positive going outputs. Inverter $I_1$ would then be omitted and gates $G_1$, $G_2$ and $G_3$ would be arranged to have input and output polarities opposite to those described above. Waveforms 1 and 2 would be applied to the first inputs of gates $G_1$ and $G_3$ and to trigger the multivibrator 111 and 113. Waveforms 4, 5, 6, 7, 8, 9, 10, 11 and 14 would then be the inverse of the forms shown in FIG. 2.

What is claimed is:

1. A separator circuit for television synchronizing signals comprising a first gate having a first input means coupled to receive said synchronizing signal, a second input, and an output; means for applying to said second input an enabling signal starting during first pulse and ending during the second pulse of the vertical synchronizing pulse group of said synchronizing signal, said applying means having an input coupled to receive said synchronizing signal and an output coupled to said second input; whereby said gate output provides a pulse having a leading edge defined by the first pulse and a trailing edge defined by the leading edge of the second pulse of the pulses of said vertical synchronizing pulse group.

2. A circuit as claimed in claim 1 wherein said applying means comprises first means for generating a pulse train which starts during the first pulse and ends at the trailing edge of the last pulse of said vertical synchronizing pulse group; means coupled to said generating means for integrating said pulse train; an amplifier coupled to said integrator; a limiter coupled to said amplifier, whereby a pulse substantially equal in length to said pulse train is produced; and a first monostable multivibrator coupled to said limiter and said gate second input.

3. A circuit as claimed in claim 2 wherein said applying means further comprises a second gate having a first input coupled to receive said synchronizing signal, a second input, an output coupled to said first gate second input; and second means having an input coupled to receive said synchronizing pulses and an output coupled to said second gate second input for generating a pulse train of pulses having a constant period and leading edges coinciding with the leading edges of said synchronizing pulses.

4. A circuit as claimed in claim 3 wherein said second generating means comprises a second monostable multivibrator.

5. A circuit as claimed in claim 1 further comprising a third gate having a first input coupled to said first gate output, a second input, and an output; and third generating means having an input coupled to receive said synchronizing signal and an output coupled to said third gate second input for generating an enabling signal during the second half of each line period.

6. A circuit as claimed in claim 5 wherein said third generating means comprises a third monostable multivibrator means for producing a pulse train from said synchronizing signal.

7. A circuit as claimed in claim 5 further comprising an inverter coupled between said first gate output and said third gate first input.

8. A circuit as claimed in claim 1 further comprising an inverter having an input coupled to receive said synchronization signals and an output coupled to said first gate first input and said applying means input.

* * * * *